July 29, 1958 J. C. PLASTARAS 2,845,012
FILM MAGAZINE FOR PHOTOTYPOGRAPHICAL MACHINES
Filed June 10, 1954 2 Sheets-Sheet 1
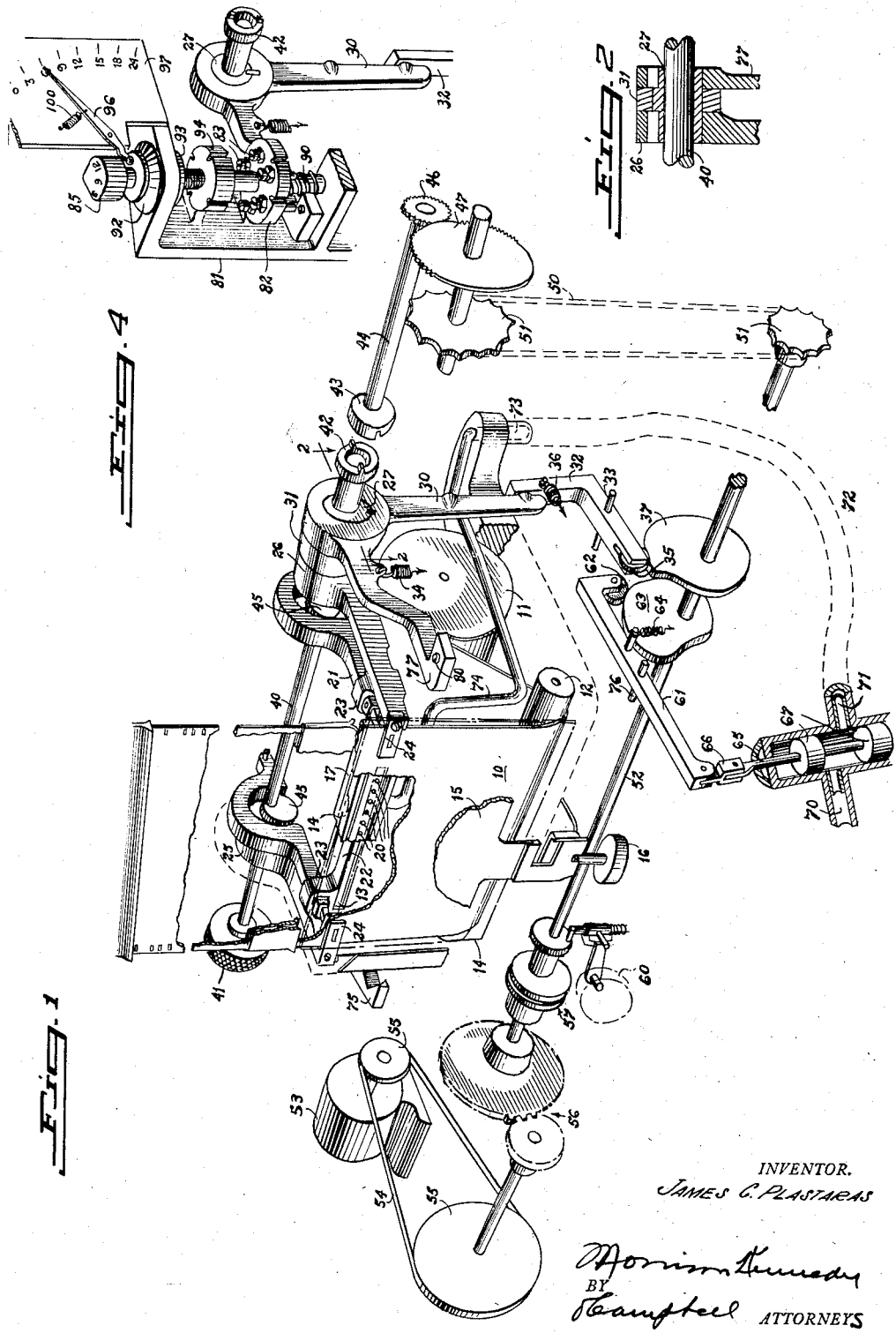
INVENTOR.
JAMES C. PLASTARAS
BY
ATTORNEYS July 29, 1958 J. C. PLASTARAS 2,845,012
FILM MAGAZINE FOR PHOTOTYPOGRAPHICAL MACHINES
Filed June 10, 1954 2 Sheets-Sheet 2
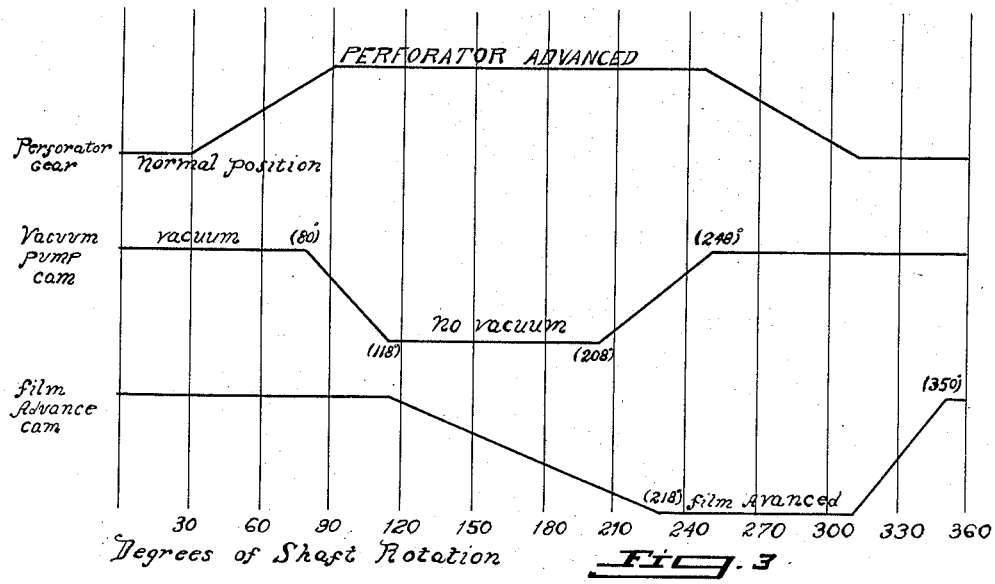
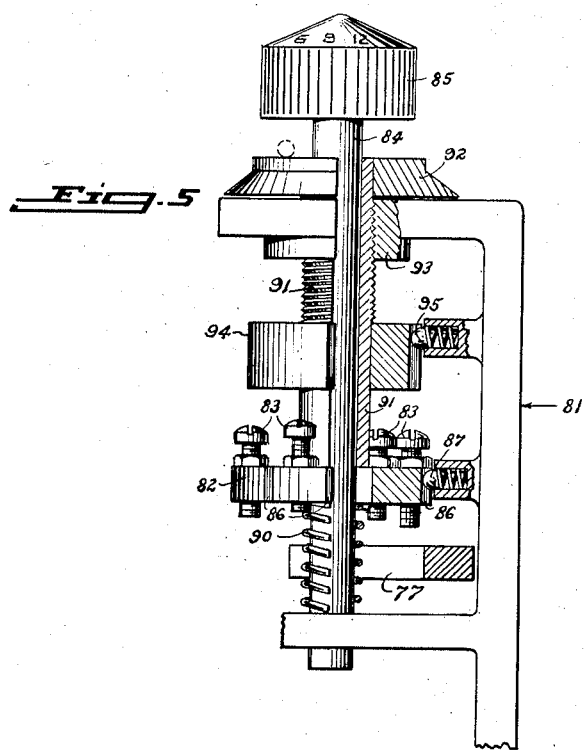
INVENTOR.
JAMES C. PLASTARAS
BY
ATTORNEYS

United States Patent Office 2,845,012
Patented July 29, 1958

2,845,012

FILM MAGAZINE FOR PHOTOTYPOGRAPHICAL MACHINES

James C. Plastaras, Lynbrook, N. Y., assignor to Mergenthaler Linotype Company, a corporation of New York Application June 10, 1954, Serial No. 435,705

10 Claims. (Cl. 95—4.5)

The invention relates to a film magazine for a phototypographical machine such as that disclosed in copending application Serial No. 419,012, filed March 26, 1954, and assigned to the assignee of the present invention. More particularly, the invention relates to a mechanism for advancing the film in the magazine after the photographing of a line of type characters and preparatory to the photographing of a succeeding line.

In automatically composing text matter in a phototypographical machine, the film on which the characters are recorded is advanced at the completion of a line of text to bring an unexposed portion thereof into photographic position. The text may be composed "solid," that is, successive lines spaced apart at a minimum normal distance, or the interline spacing may be increased beyond this minimum distance, in which latter case the lines are said to be "leaded." The manner of composing the text will, of course, be based upon the typographic requirements of the work being done. In order to provide a phototypographical machine of suitable versatility to meet the basic requirements of the art, a mechanism capable of executing the foregoing composing techniques is highly desirable.

Furthermore, it is recognized that in photocomposition work, errors appear in the processed film which have to be corrected prior to the making of a printing plate. To facilitate the replacement of incorrectly composed text matter with a correct copy thereof, each line of text is provided with a pair of perforations which are located in a predetermined position with respect to the associated line. The perforations may also be used when it is desired to edit or otherwise modify the processed film. A correction method and apparatus are disclosed in copending application Serial No. 422,862, filed April 13, 1954, now Patent No. 2,794,486, and assigned to the assignee of the present invention.

An object of this invention is to provide an improved film magazine particularly suited for use in the phototypographical machine disclosed in the aforesaid application Serial No. 419,012.

It is a further object of this invention to provide a film magazine in which the film is perforated to facilitate correction and editing thereof.

It is still another object of this invention to provide a film magazine according to the preceding object in which the perforations are used to advance the film in the magazine.

In carrying out the invention, mechanism is provided whereby after photographing a line of text material, a pair of punches perforate the film in predetermined position with respect to the line of text. The punches remain engaged with the film to advance it and bring an unexposed portion thereof into position for photographing the succeeding line. After the film advance, the punches are withdrawn until the succeeding line has been photographed, at which time, the foregoing sequence is repeated.

Other features and advantages will be apparent from the description which follows.

In the drawings:

Fig. 1 is a view in perspective, with parts broken away, showing the film perforating and advance mechanism;

Fig. 2 is a sectional view taken along line 2—2 of Fig. 1;

Fig. 3 is a schematic timing diagram illustrating the sequence of operations in the mechanism;

Fig. 4 is a view in perspective showing the mechanism for regulating the advance of the film; and Fig. 5 is an enlarged view, partly in plan and partly in vertical section, of the adjustable stud disk which controls the advance of the film.

Referring to Fig. 1, a film strip 10 is shown wound on a storage reel 11 which is journaled in a light proof enclosure (not shown) and is tensioned or braked so that it turns to unwind the film only upon the exertion of some force on the film. The film strip 10 is carried around roll 12 and past opening or slot 13 in the front cover 14 of the light proof enclosure to a cassette (not shown) which is mounted atop the light proof enclosure. A sliding shutter 15 is provided to close opening 13 and make the entire film magazine light tight as it is being loaded with fresh film. A solenoid 16 is provided to open the shutter when text matter is being composed. During composition of a line, the film is held snugly in photographing position by a vacuum frame 17 immediately behind the exposed portion of film, which frame is provided with a plurality of small openings 20 whereby the air behind the film can be exhausted. As will hereafter be seen, the film is released when it is to be advanced in the magazine.

Within the light proof enclosure and bearing a predetermined relationship to a line to be photographed is a pair of film perforators 21 slidably supported in frame member 22 by guides 23. A pair of dies 24 located in front of, and through which perforators 21 pass, are secured to frame arms 25 and 26, the latter of which in turn is keyed to a hollow rocker shaft 27 (see Fig. 2). Also keyed to shaft 27 is a bell crank 30, separated from arm 26 by spacer member 31. The depending arm of crank 30 abuts angle arm 32 which is pivotally mounted on a fixed rod 33. A tension spring 34 maintains the crank 30 in abutting relationship with the arm 32. The extreme end of angle arm 32 is provided with a follower roller 35 which, under the influence of spring 36, rides on the film advance cam 37.

Passing through hollow rocker shaft 27 and rotatable therein is the perforator drive shaft 40. A knurled knob 41 is provided on one end of the shaft to permit manual rotation of the shaft, when desired. The other end of the shaft terminates in a coupling member 42 which together with member 43 joins shaft to the driven shaft 44. A pair of eccentrics 45, keyed to perforator drive shaft 40, are located within arched portions of film perforators 21 so that, as shaft 40 is rotated, the eccentrics drive the perforators forwardly to perforate the film and thereafter rearwardly to free the film in preparation for further perforating. As the perforators move forwardly, they pierce the film and enter the dies 24.

The driven shaft 44 is provided with a gear 46 which is engaged by segmental gear 47, the latter being rotated by chain 50 and sprockets 51. The power driving shaft 52 is connected to a source of power, e. g. electric motor 53, by means of belt 54 and pulleys 55, spur gears 56 and clutch 57. Each time the clutch is engaged, as by solenoid 60, a cycle of operations, later to be described, is initiated.

In addition to the previously described mechanisms that are operated from the power shaft 52, there is also operated therefrom a vacuum control mechanism for vacuum frame 17. Such mechanism comprises a pivoting lever 61 which is provided at one extremity with a roller 62 following the contour of vacuum control cam 63 under the influence of tension spring 64. The other extremity of the lever 61 is connected to piston rod 65 by link 66.

Pistons 67 control the free passage from the inlet nozzle 70, which is connected to a vacuum pump (not shown), to the outlet nozzle 71. The outlet nozzle is connected to vacuum frame 17 by way of flexible hose 72, hollow pin 73, and tubing 74.

Pin 73 serves as a pivot point for the entire magazine, it being inserted in a stationary frame portion of the phototypographical machine. In this manner, loading of the magazine with film is greatly facilitated. Latch 75 is provided to hold the magazine in operating position but it may be readily released when it is desired to reload the magazine with film. The pivoting of the magazine enclosure is permitted by the coupling members 42 and 43 of the shafts 40 and 44.

In operation, it will be assumed that a line of text matter has been photographed and solenoid 60 energized. (This solenoid corresponds with solenoid $L^{10}$ in the aforementioned copending application Serial No. 419,012.) As was noted above, during composition of a line the vacuum pump is directly connected to the vacuum frame 17 and this is the assumed initial condition. Energization of solenoid 60 engages clutch 57 so that motor 53 drives shaft 52 and, through chain 50 and sprockets 51, segmental gear 47. A toothed section of gear 47 soon rotates perforator shaft 40 whereby the eccentrics 45 slide the perforators 21 forward to pierce the film, the perforators lodging in dies 24. At this time a stripped or smooth section of gear 47 meets gear 46 and the rotation of the perforator shaft is halted. By this time, however, power driving shaft 52 has rotated sufficiently to bring the dwell of vacuum cam 63 under follower roller 62, thereby permitting spring 64 to pivot lever 61 about rod 76 and lift pistons 67 in the cylinder to disconnect flexible hose 72 from the vacuum pump. This action frees the film 10 from its adherence to the vacuum frame 17, thus readying the mechanism for its next operation which is the advance of the film.

The continued rotation of shaft 52 brings the dwell of cam 37 under roller 35, permitting angle arm 32 to be urged forward by tension spring 36. Such forward movement of the arm 32 rocks bell crank 30 clockwise and because of its keyed connection to shaft 27, the latter is also rocked in the same direction. Movement of shaft 27, in turn, pivots arm 26 which is keyed thereto, frame 22 which is integral with arm 26, and, through the frame, arm 25. The frame 22 carries the perforators (still projecting through the film) upwardly, thus advancing the film in the magazine. The advance of the film as so far described will be controlled by the contour of cam 37 but, as will hereafter be described, additional mechanism is provided to regulate the advance of the film in accordance with the point size of the recorded images and the interline spacing of the text material.

After the film has been advanced as desired, the vacuum pump is again connected to the vacuum frame to thereby snugly hold the film in photographic position in the magazine. During the foregoing occurrences, the segmental gear 47 is rotating, but only a stripped section thereof passed gear 46. When the film is vacuum-gripped in the magazine, a toothed section of gear 47 again engages gear 46 to rotate the perforator shaft and cause the eccentrics 45 to withdraw the perforators from the film. Thereafter cam 37 returns angle arm 32 to its normal position and permits spring 34 to restore bell crank 30, arms 25 and 26 and perforators 21 to their normal position ready for another cycle of operations after the completion of the photographing of another line on the film. At this time, solenoid 60 is deenergized to disengage clutch 57 and thereby disconnect power driving shaft from the power source. The sequence of events may further be understood by reference to the timing diagram of Fig. 3.

In the foregoing description, the advance of the film was assumed to be controlled solely by the contour of cam 37. Of course, the cam will in all events limit the maximum advance of the film but intermediate degrees of film advance can be obtained by limiting the movement of bell crank arm 30, as by providing it at its forward end 77 with an abutment pin 80 to cooperate with an adjustable stop device presently to be described.

The mechanism for controlling the amount of film advance will now be described with reference to Figs. 4 and 5. A bracket 81 fixedly mounted on the phototypographical machine base supports the film advance control mechanism in a position adjacent the arm 77 of bell crank 30. A character point size plate 82, having a plurality of stop screws 83, is pinned to shaft 84 which in turn is fitted with a point size knob 85. The periphery of plate 82 has a plurality of recesses 86 which are engaged by a spring loaded ball 87 when a stop screw 83 is turned into a film advance limiting position. Plate 82 and shaft 84 are slidable in a vertical direction and they are urged upwardly by compression spring 90. The position of plate 82 (and shaft 84) is determined, however, by tubular shaft 91, within which shaft 84 slides. The upper extremity of shaft 91 is provided with a knob 92 pinned thereto and the external surface of the shaft is threaded for controlled movement through internally threaded member 93. A detent disk 94, pinned to shaft 91, is engaged by spring loaded ball 95 and thereby maintains shaft 91 in an adjusted position. Rotation of knob 92 controls the position of shaft 91 and thereby the position of plate 82, which latter is urged against the lower end of shaft 91 by spring 90. One end of indicator pointer lever 96 rides on the top surface of knob 92 while the other end thereof scans scale 97 and indicates the leading or interline space setting for the mechanism. A tension spring 100 maintains the pointer lever in engagement with knob 92.

The mechanism thus described is capable of controlling the film advance in the magazine in accordance with any desired combination of text point size and interline point size. Each of the stop screws will be set for a particular point size corresponding to the markings on knob 85. When the knob is turned until the desired point size marking faces the front of the machine, the appropriate adjustment screw will be in position to limit movement of bell crank 30. For normal or solid spacing of successive lines of text, knob 92 is turned until pointer 96 corresponds with the marking "zero" on scale 97. This will be seen to place shaft in its lowermost operating position. If it is desired to lead the lines of text, knob 92 is turned until pointer 96 indicates the amount of desired leading. As pointer 96 moves to higher scale markings, shaft 84 is moved upwardly, thus moving plate 82 upwardly to permit a wider swing of bell crank 30 and consequently a greater advance of film.

Having thus described the invention in a preferred embodiment, it is not intended to set forth all the variations that may be made, but it is contemplated that many widely different embodiments of the invention can be made without departure from the spirit and scope of the invention. It is therefore intended that all matter contained in the above description or shown in the accompanying drawings shall be interpreted as illustrative and not in a limiting sense.

What is claimed is:

1. In or for a phototypographical machine, the combination of a film capable of being advanced endwise through the machine in step by step fashion and upon which transverse type lines are photographed one after another in spaced relation, a pair of punches for producing perforations in the film at the opposite ends of each type line and outside of the photographic area, said perforations bearing a predetermined relationship to each type line, a corresponding pair of dies to cooperate with the punches, means for operating the punches after each line has been photographed, first, to effect the perforation of the film and, later, to withdraw the punches from the perforations in the film, means for moving the punches and their cooperating dies in the direction of advance of the film after the punches have perforated the film but before they are withdrawn from the dies to advance the film the required distance for interline spacing, means for restoring the punches and the dies to their original film perforating position after the punches have been withdrawn from the dies following the advance of the film, releasable means for holding said film at the photographic position, and means coordinated with the punch operating mechanism for actuating said holding means before the punches have been withdrawn from the film and for releasing said holding means after the said punches have again perforated the film.

2. The combination according to claim 1, wherein the punches and their cooperating dies are mounted for a pivotal movement in advancing the film.

3. The combination according to claim 1, wherein the means for operating the punches include rotary eccentrics which maintain operative engagement with the punches in their film advanced position as well as in their film perforating position.

4. The combination according to claim 1 in which the releasable holding means comprise a vacuum frame having means for disabling it after the punch has pierced the film and for reestablishing it before the punch is withdrawn from the film.

5. The combination according to claim 1, wherein the punches and their cooperating dies are fixed to a hollow rocker shaft which forms part of the film advancing means.

6. The combination according to claim 5, wherein the means for operating the punches include rotary eccentrics fixed to a power driven shaft which passes through the hollow rocker shaft.

7. The combination according to claim 5, wherein the film advancing means include a bell crank lever mounted concentrically to the rocker shaft and keyed thereto, and a power driven cam cooperating with the bell crank lever for controlling the rocking movements of the rocker shaft.

8. The combination according to claim 7, including a fixed stop cooperating with the bell crank lever and controlling the extent of the film advance.

9. In or for a phototypographical machine, the combination of a film capable of being advanced endwise through the machine in step by step fashion and upon which transverse type lines are photographed one after another in spaced relation, a pair of punches for producing perforations in the film at the opposite ends of each type line and outside of the photographic area, said perforations bearing a predetermined relationship to each type line, a corresponding pair of dies to cooperate with the punches, means for operating the punches after each line has been photographed, first, to effect the perforation of the film and, later, to withdraw the punches from the perforations in the film, means for moving the punches and their cooperating dies in the direction of advance of the film after the punches have perforated the film but before they are withdrawn from the dies to advance the film the required distance for interline spacing, means for restoring the punches and the dies to their original film perforating position after the punches have been withdrawn from the dies following the advance of the film, adjustable stop means cooperating with the film advancing means to control the extent of the film advancing movement of the punches and their cooperating dies in accordance with the point size of the type character being composed, and further adjustable stop means cooperating with the film advancing means to control the extent of the film advancing movement of the punches and their cooperating dies in accordance with the interline spacing desired.

10. In or for a phototypographical machine, the combination of a film capable of being advanced endwise through the machine in step by step fashion and upon which transverse type lines are photographed one after another in spaced relation, a pair of punches for producing perforations in the film at the opposite ends of each type line and outside of the photographic area, said perforations bearing a predetermined relationship to each type line, a corresponding pair of dies to cooperate with the punches, means for operating the punches after each line has been photographed, first, to effect the perforation of the film and, later, to withdraw the punches from the perforations in the film, means for moving the punches and their cooperating dies in the direction of advance of the film after the punches have perforated the film but before they are withdrawn from the dies to advance the film the required distance for interline spacing, means for restoring the punches and the dies to their original film perforating position after the punches have been withdrawn from the dies following the advance of the film, and adjustable stop means cooperating with the film advancing means to control the extent of the film advancing movement of the punches and their cooperating dies in accordance with the interline spacing desired, said adjustable stop means comprising a rotatable plate having a plurality of abutments independently adjustable thereon, and means for setting the plate in different rotary stop positions.

References Cited in the file of this patent

UNITED STATES PATENTS

| | | |
|---|---|---|
| 1,283,394 | Bawtree | Oct. 29, 1918 |
| 1,443,433 | Rockstroh | Jan. 30, 1923 |
| 1,936,923 | Troenkle | Nov. 28, 1933 |
| 2,036,000 | Uher | Mar. 31, 1936 |
| 2,227,987 | Tuttle | Jan. 7, 1941 |
| 2,351,399 | Caracciolo | June 13, 1944 |
| 2,630,743 | O'Kane | Mar. 10, 1953 |
| 2,673,487 | Bumstead | Mar. 30, 1954 |